(12) United States Patent
Pelton et al.

(10) Patent No.: US 7,943,713 B2
(45) Date of Patent: May 17, 2011

(54) POLYMERIC BORONIC ACID DERIVATIVES AND THEIR USE FOR PAPERMAKING

(75) Inventors: Robert H. Pelton, Dundas (CA); Chen Lu, Cordova, TN (US)

(73) Assignee: BASF Aktiengesellschaft, Ludwigshafen (DE)

( * ) Notice: Subject to any disclaimer, the term of this patent is extended or adjusted under 35 U.S.C. 154(b) by 1067 days.

(21) Appl. No.: 11/658,761

(22) PCT Filed: Jul. 29, 2005

(86) PCT No.: PCT/CA2005/001186
§ 371 (c)(1),
(2), (4) Date: Jan. 29, 2007

(87) PCT Pub. No.: WO2006/010268
PCT Pub. Date: Feb. 2, 2006

(65) Prior Publication Data
US 2008/0099172 A1 May 1, 2008

Related U.S. Application Data

(60) Provisional application No. 60/592,145, filed on Jul. 30, 2004, provisional application No. 60/620,447, filed on Oct. 21, 2004.

(51) Int. Cl.
*C08F 130/06* (2006.01)
(52) U.S. Cl. ............. 526/239; 526/303.1; 526/304; 526/307.3; 526/307.4; 526/307.5
(58) Field of Classification Search .......... 526/239, 526/303.1, 304, 307.3, 307.4, 307.5
See application file for complete search history.

(56) References Cited

U.S. PATENT DOCUMENTS

| | | | |
|---|---|---|---|
| 2,868,664 A | | 1/1959 | Goldstein et al. |
| 2,931,788 A | | 4/1960 | Hoffmann et al. |
| 3,923,781 A | | 12/1975 | Rogers |
| 3,972,918 A | * | 8/1976 | Stanley et al. ......... 562/445 |
| 4,309,369 A | | 1/1982 | Overton |
| 5,478,575 A | * | 12/1995 | Miyazaki et al. ....... 424/487 |
| 6,267,952 B1 | | 7/2001 | Mandeville, III et al. |
| 6,596,267 B1 | * | 7/2003 | Hubbell et al. ........ 424/78.26 |

FOREIGN PATENT DOCUMENTS

| | | |
|---|---|---|
| DE | 2 328 526 | 1/1974 |
| SU | 796 292 | 1/1981 |
| SU | 1268648 | 7/1986 |
| WO | 98 55694 | 12/1998 |
| WO | 2004 046211 | 6/2004 |

OTHER PUBLICATIONS

E. Uguzdogan, et al., "Stimuli-Responsive Properties of Aminophenylboronic Acid-Carrying Thermosensitive Copolymers", Polymer International, vol. 52, pp. 649-657, 2003.

E. Uguzdogan, et al., "RNA-Sensitive N-Isopropylacrylamide/vinylphenylboronic Acid Random Copolymer", Macromolecular Bioscience, vol. 2, No. 5, pp. 214-222, 2002.
Alfred Deutsch, et al., "Conductimetric and Potentiometric Studies of the Stoichiometry and Equilibria of the Boric Acid-Mannitol Complexes", Journal of the American Chemical Society, vol. 71, No. 5, pp. 1637-1640, 1949.
R.S. Seth, et al., "The Strength of Wet Webs: A New Approach", Tappi Journal, vol. 65, No. 3, pp. 135-138, 1982.
L. M. Lyne, et al., "Measurement of Wet Web Strength", Tappi, vol. 37, No. 12, pp. 694-698, 1954.
Rajinder S. Seth, "The Effect of Fiber Length and Coarseness on the Tensile Strength of Wet Webs: A Statistical Geometry Explanation", Tappi Journal, vol. 78, No. 3, pp. 99-102, 1995.
D. H. Page, "A Quantitative Theory of the Strength of Wet Webs", Journal of Pulp and Paper Science, vol. 19, No. 4, pp. J175-J176, 1993.
Makhlouf Laleg, et al., "Wet-Web Strength Increase by Chitosan", Nordic Pulp and Paper Research Journal, No. 3, pp. 99-103, 1991.
Makhlouf Laleg, et al., "Unconventional Strength Additives", Nordic Pulp and Paper Research Journal, No. 8, pp. 41-47, 1993.
Nicole Chen, et al., "Mechanisms of Aldehyde-Containing Paper Wet-Strength Resins", Ind. Eng. Chem. Res., vol. 41, pp. 5366-5371, 2002.
Robert Bates, et al., "Wet Strengthening of Paper", Fapet Oy: Helsinki, Chapter 13, pp. 288-301,1999.
Herbert H. Espy, "Wet-Strength Resins and Their Application", Tappi Press, pp. 14-44, 1994.
Robert Pelton, et al., "Some Properties of Newsprint Impregnated With Polyvinylmamine", Tappi Journal, vol. 1, No. 10, pp. 21-26, 2002.
Linda Gaerdlund, et al., "Polyelectrolyte Complexes for Surface Modification of Wood Fibres, II. Influence of Complexes on Wet and Dry Strength of Paper", Colloids and Surface A: Physicochem. Eng. Aspects, vol. 218, pp. 137-149, 2003.
Akira Matsumoto, et al., "Swelling and Shrinking Kinetics of Totally Synthetic, Glucose-Responsive Polymer Gel Bearing Phenylborate Derivative as a Glucose-Sensing Moiety", Macromolecules, vol. 37, pp. 1502-1510, 2004.

(Continued)

*Primary Examiner* — Bernard Lipman
(74) *Attorney, Agent, or Firm* — Oblon, Spivak, McClelland, Maier & Neustadt, L.L.P.

(57) ABSTRACT

Polymeric compounds of formula I comprising boronic acid are provided. These polymeric compounds are prepared either by grafting boronic acid containing compounds (e.g. 4-carboxyphenylboronic acid) to hydrolysed poly(N-vinylformamide) or hydrolysing copolymer(s) obtained by copolymerizing vinyl group containing boronic acid monomers (e.g. -vinylphenyl boronic acid) and N-vinylformamide. These polymeric compounds are used in increasing the wet strength of paper in paper-making processes. Formula (I).

23 Claims, 13 Drawing Sheets

OTHER PUBLICATIONS

G. Keita, et al., "The Poly(Vinyl Alcohol)-Borate System: Influence of Polyelectrolyte Effects on Phase Diagrams", Polymer, vol. 36, No. 1, pp. 49-54, 1995.

Victor D. Gildengorn, "Reversed-Phase Affinity Chromatography of Ecdysteroids With Boronic Acid-Containing Eluents", Journal of Chromatography A, vol. 730, No. 1-2, pp. 147-152, 1996.

Ali Sarhan, "Racemic Resolution FO Mandelic Acid on Polymers With Chiral Cavities, 4[a]", Makromolekulare Chemie-Macramolecular Chemistry and Physics, vol. 190, No. 9, pp. 2031-2039, 1989.

Soundaramani Soundararajan, et al., "Boronic Acids for Affinity Chromatography: Spectral Methods for Determinations of Ionization and Diol-Binding Constants", Analytical Biochemistry, vol. 178, No. 1, pp. 125-134, 1989.

Eiichi Shoji, et al., Potentiometric Saccharide Detection Based on the pKa Changes of Poly(Aniline Boronic Acid), Journal of the American Chemical Society, vol. 124, No. 42, pp. 12486-12493, 2002.

Greg Springsteen, et al., "A Detailed Examination of Boronic Acid-Diol Complexation", Tetrahedron, vol. 58, No. 26, pp. 5291-5300, 2002.

Daijiro Shiino, et al., "Amine Containing Phenylboronic Acid Gel for Glucose-Responsive Insulin Release Under Physiological pH", Journal of Controlled Release, vol. 37, No. 3, pp. 269-276, 1995.

Daijiro Shiino, et al., "Amine Effect on Phenylboronic Acid Complex With Glucose Under Physiological pH in Aqueous Solution", Journal of Biomatdrials Science-Polymer Edition, vol. 7, No. 8, pp. 697-705, 1996.

Masazo Niwa, et al., "Surface Monolayers of Polymeric Amphiphiles Carrying a Copolymer Segment Composed of Phenylboronic Acid and Amine. Interaction With Saccharides at the Air-Water Interface", Langmuir, vol. 14, No. 14, pp. 3916-3920, 1998.

Xiao-Chuan Liu, et al., "Studies on Oriented and Reversible Immobilization of Glycoprotein Using Novel Boronate Affinity Gel", Journal of Molecular Recognition, vol. 9, No. 5-6, pp. 462-467, 1996.

A. E. Ivanov, et al., "Synthesis of Boronate-Containing Copolymers of N, N-Dimethylacrylamide, Their Interaction With Poly(Vinyl Alcohol) and Rheological Behaviour of the Gels", Polymer, vol. 45, No. 8, pp. 2495-2505, 2004.

* cited by examiner

POLYMERIC BORONIC ACID DERIVATIVES AND THEIR USE FOR PAPERMAKING

FIELD OF THE INVENTION

This invention relates to polymers, in particular polymer derivatives which contain boronic acid. The invention also relates to uses of such polymers and complex compounds containing same in papermaking.

BACKGROUND OF THE INVENTION

Both paper wet web strength and paper wet strength have always been desired strongly by papermakers. Paper wet web strength refers to the ability of a never-dried paper web on a paper machine to resist breakage. Low wet-web strength can lead to frequent breaks which interrupt production and lower paper machine efficiency. On the other hand, paper wet strength refers to the strength of re-wetted paper. Good wet strength is necessary for many commercial paper products, such as filter papers, sanitary tissues, and packaging papers.

The paper web is mainly a matrix of fibers. The ability of the wet web to resist tearing depends upon both the strength of fiber-fiber bonds and the ability of the fiber network to stretch.[1] Since wet webs contain as much as 85% water at the end of the forming section, modern paper machines usually support the web through to the press section where water content is about 50%. Under these conditions capillary forces and mechanical entanglement are the primary contributors to fiber-fiber bonding and wet web strength.[2, 3] The standard approaches to improving wet web strength are to decrease the water content or increase the long fiber fraction.[4] However, increased costs or lower production rates limit these options. Two polymeric additives, chitosan and cationic aldehyde starch, were proposed to enhance wet web tensile strength by cross-linking fibers.[5, 6] Unfortunately, both polymers are impeded at alkaline conditions, which are preferred for the modern papermaking process. Chitosan is water soluble only at acidic condition, while the adhesion of cationic aldehyde starch to fibers is weakened significantly at above neutral pH.[7]

A wide range of commercial additives have been applied by papermakers to increase paper wet strength. Under acidic papermaking conditions, urea-formaldehyde resins and melamine-formaldehyde resins are preferred. Whereas, wet-strength resins based on polyamine-epicholorohydrin chemistry are favored under neutral and alkaline conditions.[8] It was proposed that upon drying, wet-strength resins cross-link with themself and also form covalent bonds with paper fibers, leading to increased paper wet strength.[9] However, most commercial wet-strength resins are not environmentally friendly. At the same time, they are not stable under aqueous conditions and can only be stored for a short period of time. Recently, much research work has focused on developing highly efficient and stable green additives to increase paper wet strength. Examples are polyvinylamine[10], polyelectrolyte complexes[11], and borate/guar gel[12].

SUMMARY OF THE INVENTION

Disclosed herein are novel polymer derivatives comprising boronic acid, which have the ability to increase both paper wet web strength and wet strength. Under alkaline conditions, boronic acid becomes $sp^3$ hybridized ($-B(OH)_3$) and forms esters (i.e. covalent bond) with cis diols on carbohydrates and polyols.[13] However, there is evidence that in an amine-rich environment, esterification can occur at pH values as low as 6.[14] A number of applications of boronic acid derivates have been described in the literature. For example, boronic acid-containing hydrogel was proposed as a bio-sensor of glucose.[15]

In one aspect, the invention relates to polymeric compounds having general formula 1 or 1A:

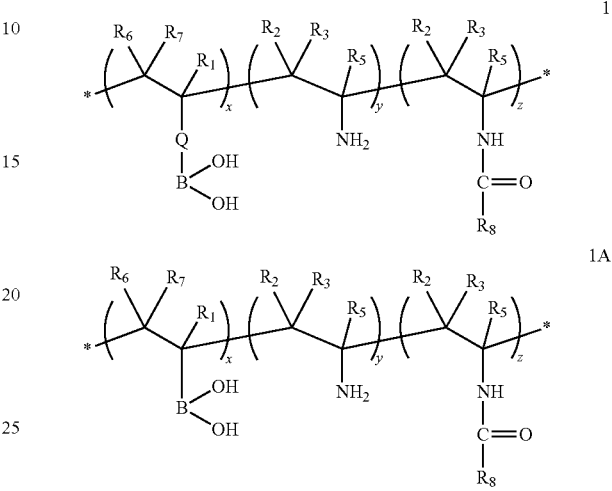

wherein $R_1$ and $R_5$ are each independently selected from H, $C_1$ to $C_6$ branched or non-branched alkyl, substituted or non-substituted cyclic alkyl, substituted or non-substituted aryl, and a ring containing a heteroatom;

$R_2$, $R_3$, $R_6$ and $R_7$ are each independently selected from H, $C_1$ to $C_6$ branched or non-branched alkyl, substituted or non-substituted cyclic alkyl, substituted or non-substituted aryl, and a ring containing a heteroatom or $R_2$ and $R_3$ and/or $R_6$ and $R_7$ are together involved in a ring which is optionally substituted;

Q is selected from $C_1$ to $C_{12}$ branched or non-branched alkyl, substituted or non-substituted cyclic alkyl, substituted or non-substituted phenyl and substituted or non-substituted fused alkyl or phenyl ring, optionally Q bears a cationic group, an anionic group or is a ring including a hetero atom; and x, y and z are the numbers of the repeating monomer units; x is selected from 1 to about 100,000 or more; y and z may be 0 or range up to 100,000 or more.

Preferred embodiments of the above general formula are as follows:

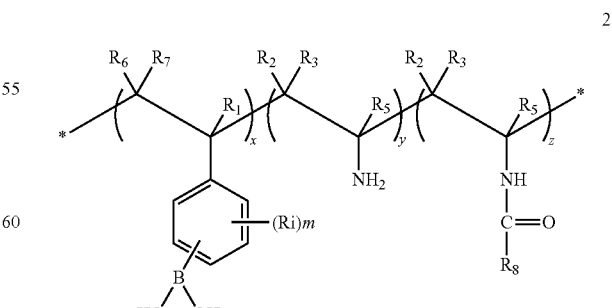

m=0, 1, 2, 3 or 4;
$R_1$, $R_2$, $R_3$, $R_4$, $R_5$, $R_6$ and $R_7$ are as defined above.

Ri is selected from H, $C_1$ to $C_6$ branched or non-branched alkyl, substituted or non-substituted cyclic alkyl, substituted or non-substituted phenyl, cationic group, anionic group, neutral group, and a ring including a hetero atom;

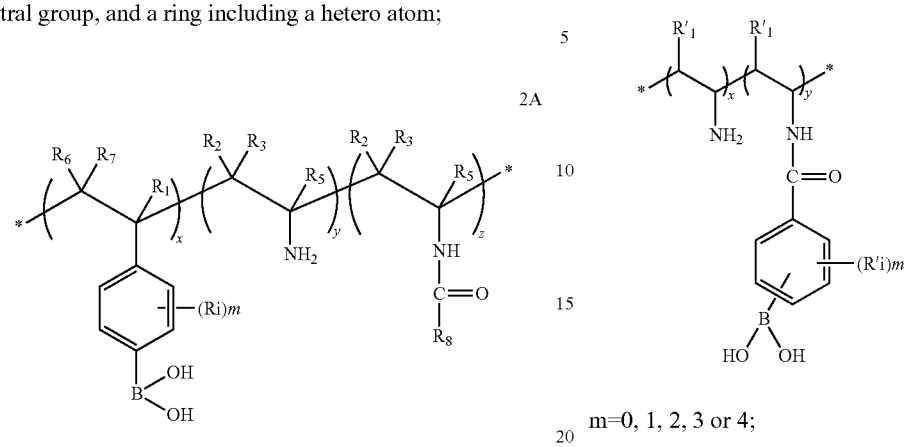

2A

3

The invention further relates to compounds of the general formula 4:

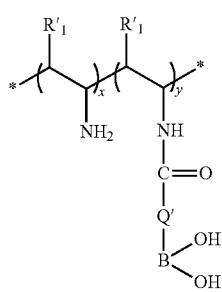

4 wherein $R_1$, Q, x and y are as defined above.

Preferred embodiments of the above formula 4 are:

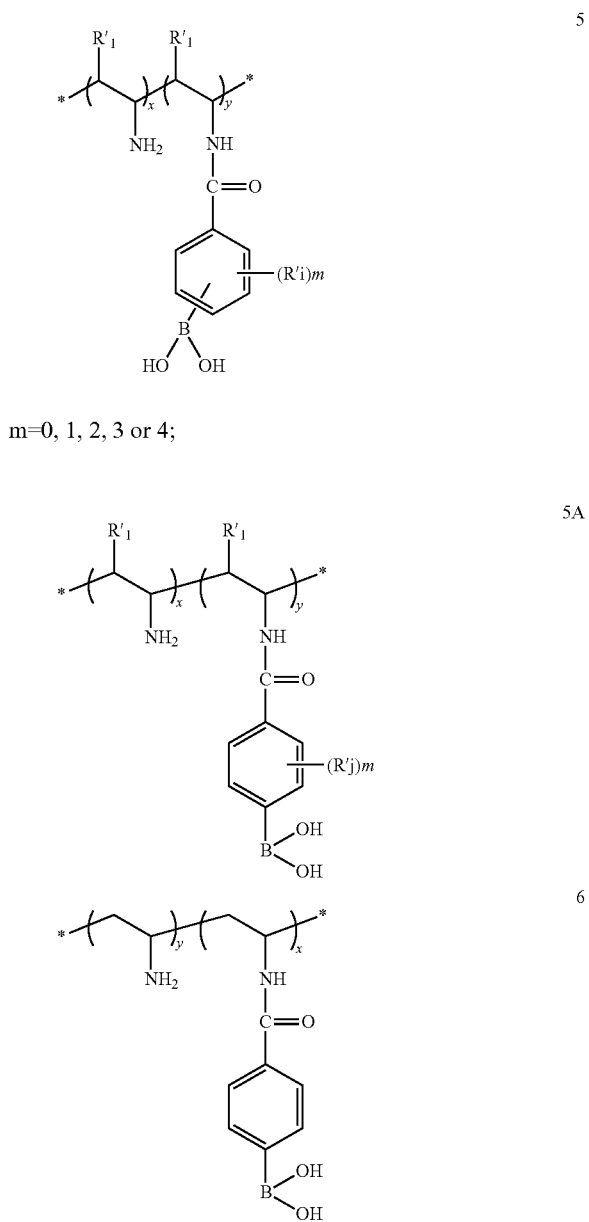

m=0, 1, 2, 3 or 4;

In other aspects, the invention further relates to the following:

A process for the preparation of a polyamine boronic acid derivative which comprises:

(a) reacting a vinyl-containing boronic acid with a N-vinyl amide to obtain a polyamide boronic acid derivative; and (b) hydrolyzing the amide to yield the polyamine boronic acid derivative.

A process for the preparation of a polyamine boronic acid derivative which comprises reacting a polyamine with a boronic acid-containing compound to yield the polyamine boronic acid derivative.

Compounds having the general formulae described above may be introduced during a manufacturing process to increase the wet web strength of paper or a web of cellulose fibers in a paper-making process. These compounds may be selected from the following: polyamine boronic acid derivative, polyamide boronic acid derivative, polyamine polyamide boronic acid derivative, polyamino acid boronic acid derivative, cationic boronic acid-containing polymer, anionic boronic acid-containing polymer, neutral boronic acid-containing polymer, and modified particles from boronic acid introduced on the surfaces of latex particles, microgel particles, or inorganic particles, boronic acid-containing polyvinylamine, boronic acid-containing polymethylvinylamine, boronic acid-containing polyallylamine, boronic acid-containing polyethyleneimine, boronic acid-containing poly(N,N-dimethyl-aminoethyl methacrylate), boronic acid-containing poly(N,N-dimethyl-aminoethyl acrylate), boronic acid-containing poly(4-aminostyrene), poly(diallyldimethylammonium), boronic acid-containing polyvinylpyridine, and boronic acid-containing chitosan, boronic acid-containing poly(acrylic acid), boronic acid-containing poly(methacrylic acid), boronic acid-containing poly(maleic acid), boronic acid-containing polystyrene sulfonate, boronic acid-containing polyvinylsulfate, and boronic acid-containing polyvinylphosphate, boronic acid-containing polyacrylamide, boronic acid-containing poly(N-isopropylacrylamide), boronic acid-containing poly(ethylene oxide), boronic acid-containing polymethacrylamide, and boronic acid-containing poly(N-vinylpyrrolidinone).

In addition, for such a purpose one may use a complex solution comprising a compound according to any one of the above named compounds and a hydroxyl-containing macromolecule or a complex solution comprising a compound according to any one of the above-named compounds and a compound selected from the group consisting of cationic water soluble polymers, anionic water soluble polymers, nonionic water soluble polymers, latex particles, microgel particles, and inorganic particles.

The invention further comprises a process of treating a cellulose film comprising:
1. providing a solution of a compound or a complex solution according to the invention in a pH buffer solution;
2. soaking the cellulose film in the solution; and
3. rinsing the cellulose film using the pH buffer solution;
optionally:
4. pressing against one another two cellulose films obtained from steps 1 through 3; and
5. separating the two films while measuring the peel force.

Said treatment may improve characteristics of the film, including one or more of paper wet web strength, paper wet strength, flocculation, coating formulation, adhesive and underwater adhesive.

The invention is further described herein by way of specific examples. However, it will be understood that the full scope of this invention is not restricted to such examples, which are intended merely to illustrate embodiments of the invention.

DETAILED DESCRIPTION

Figure 1:
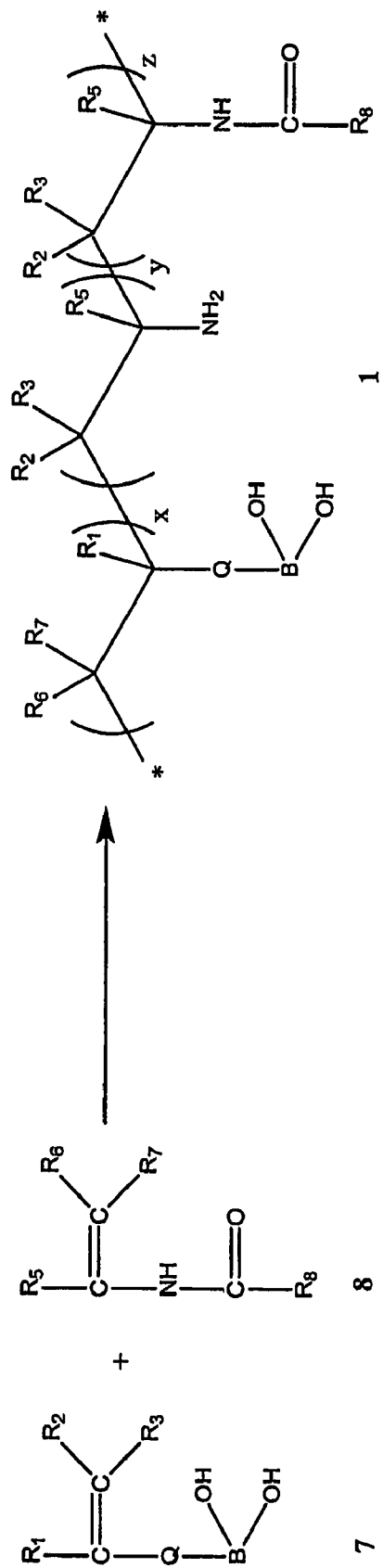
FIG. 1 is a reaction scheme showing the preparation of a polymeric boronic acid derivative according to the invention.
Figure 2:
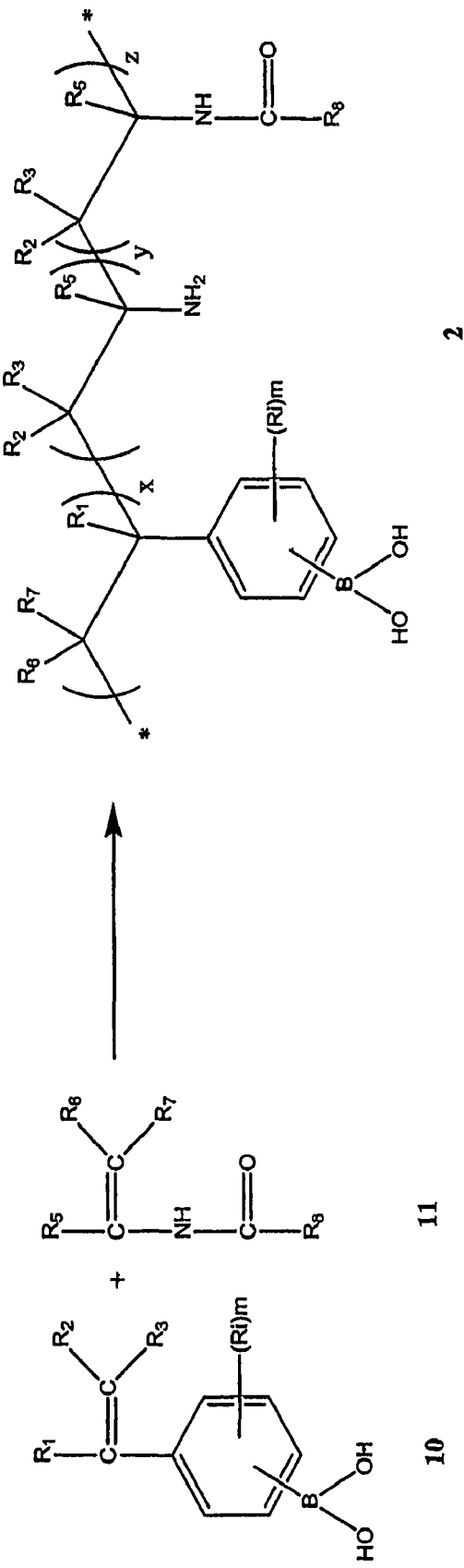
FIG. 2 is a reaction scheme showing the preparation of a polymeric boronic acid derivative according to the invention.
Figure 3:
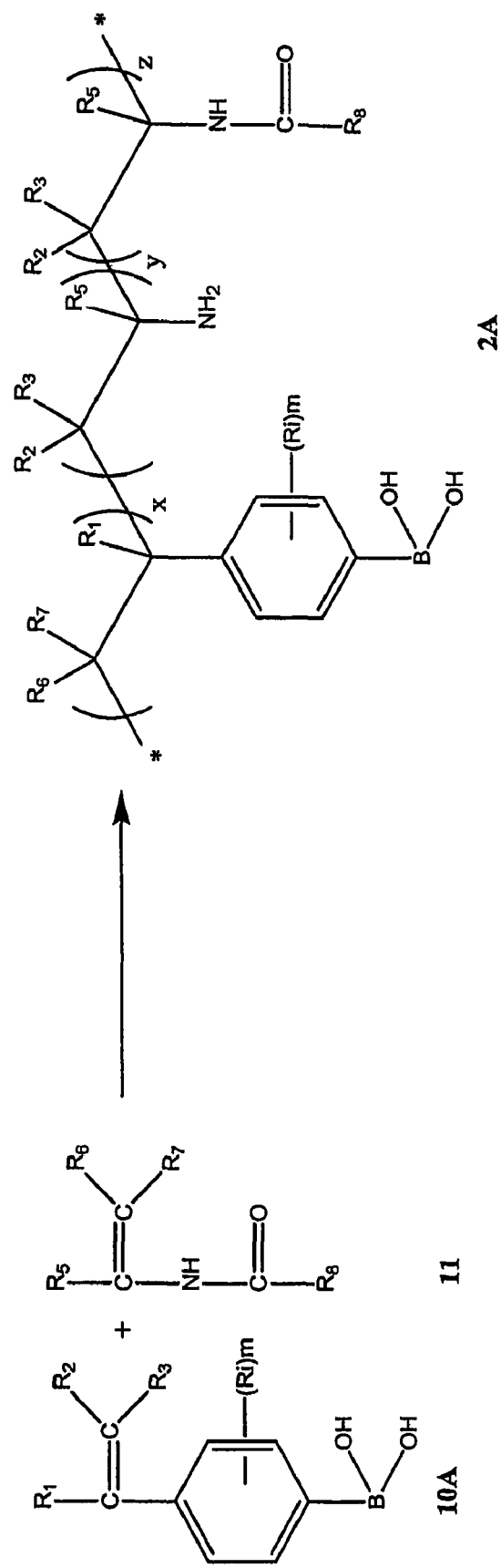
FIG. 3 is a reaction scheme showing the preparation of a polymeric boronic acid derivative according to the invention.
Figure 4:
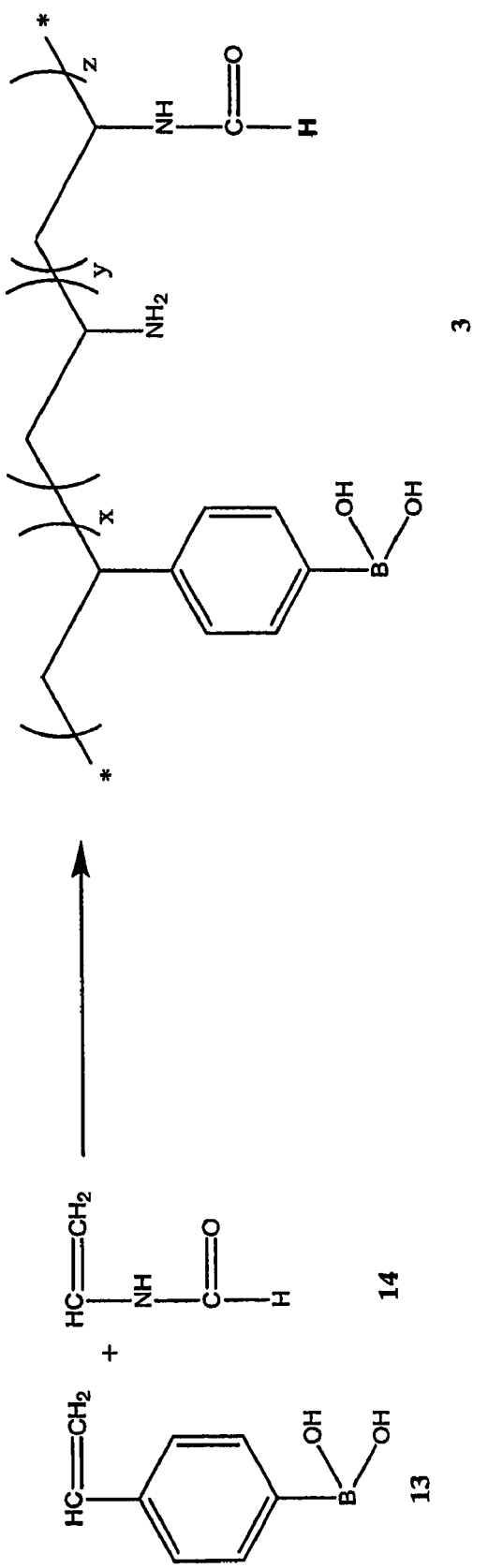
FIG. 4 is a reaction scheme showing the preparation of a polymeric boronic acid derivative according to the invention.
Figure 5:
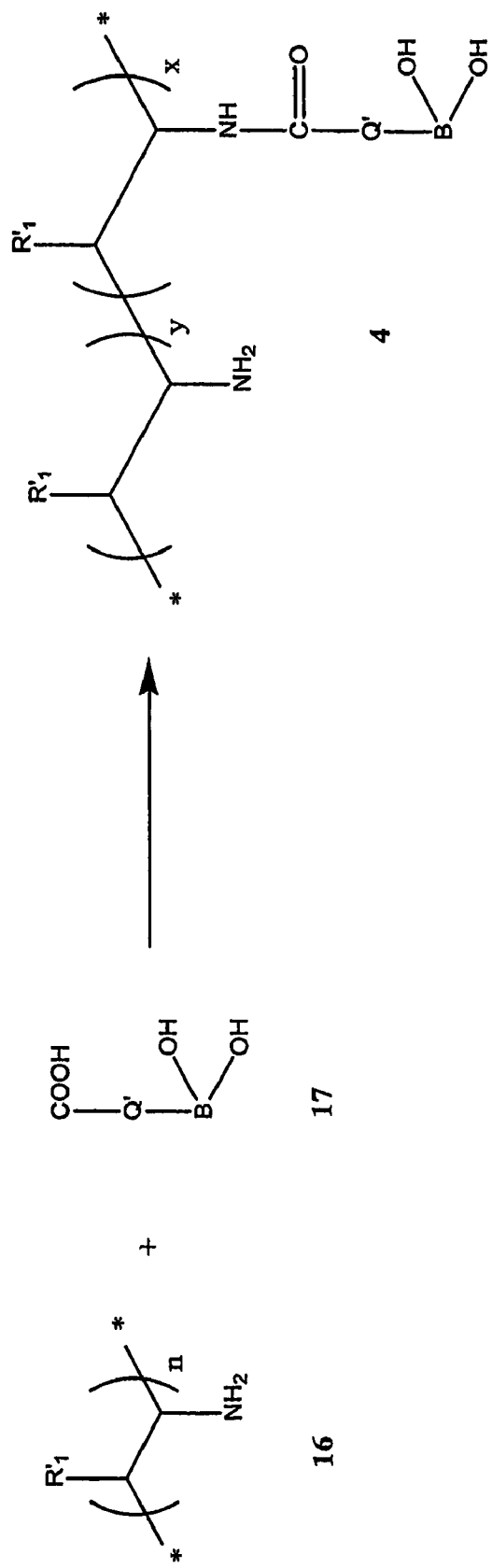
FIG. 5 is a reaction scheme showing the preparation of a polyvinylamine boronic acid derivative according to the invention.
Figure 6:
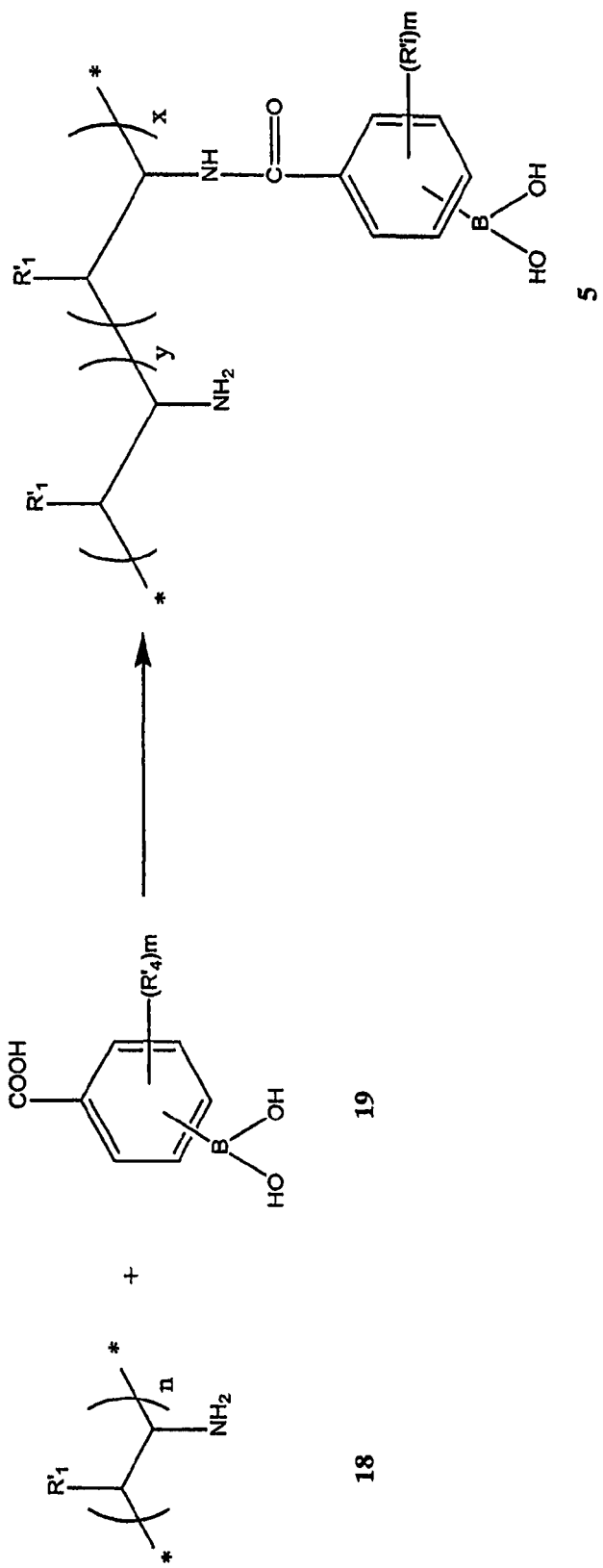
FIG. 6 is a reaction scheme showing the preparation of a polyvinylamine boronic acid derivative according to the invention.
Figure 7:
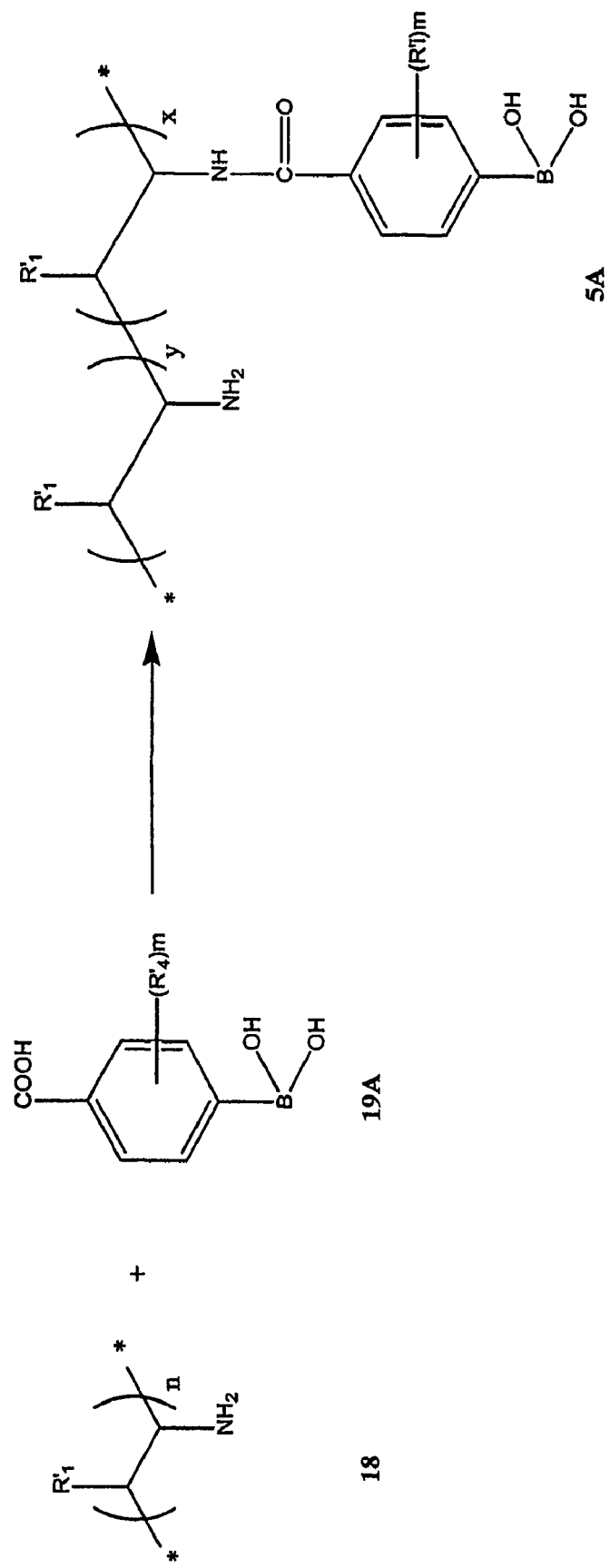
FIG. 7 is a reaction scheme showing the preparation of a polyvinylamine boronic acid derivative according to the invention.
Figure 8:
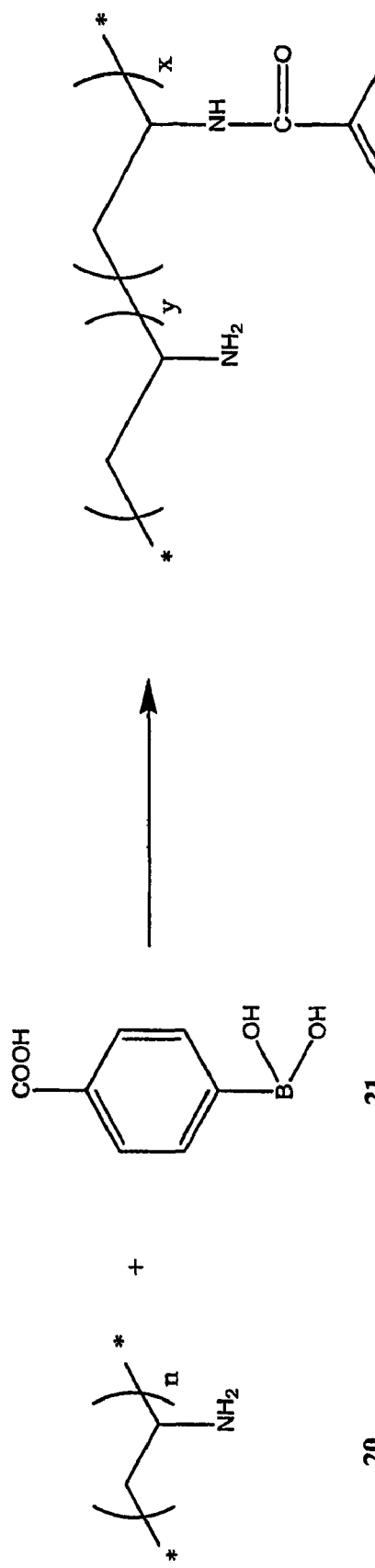
FIG. 8 is a reaction scheme showing the preparation of a polyvinylamine boronic acid derivative according to the invention.

Boronic acid-containing polyvinylamine (BPVAm) of formula 3 was prepared and found to improve paper wet web strength. Under alkaline conditions, boronic acid becomes $sp^3$ hybridized ($-B(OH)_3$) and form esters (i.e. covalent bond) with cis diols on carbohydrates and polyols. However, there is evidence that in an amine-rich environment, esterification can occur under neutral and acidic conditions. Thus, it is believed that boronic acid-containing polyvinylamine could react with cellulose (the main component of paper fibers) in the presence of water and function as cross-linking agents to increase paper wet web strength under a wide range of pH conditions (pH=3 to 10.3). Furthermore, BPVAm is particularly effective when used in conjunction with a water soluble carbohydrate such as hydroxypropyl guar (HP-guar).

Alternatively, other boronic acid-containing polymers can be used to replace BPVAm to increase the wet web strength. At the same time, boronic acid-containing polymers can form aqueous complexes with other hydroxyl group-containing polymers, such as poly(vinyl alcohol), starch, and dextran. Furthermore, cationic boronic acid-containing polymers can form complexes with anionic polymers and anionic boronic acid-containing polymers can form complexes with cationic polymers. The resulting complexes are also expected to increase paper wet web strength.

Finally, BPVA and HP-guar complex could also improve paper wet strength. The paper wet strength refers to the strength of the wetted paper. In this situation, the paper sheet is dried and wetted again, compared to the wet web strength, which refers to the strength of never dried paper.

The preparation is described below of a polymeric compound of formula 3:

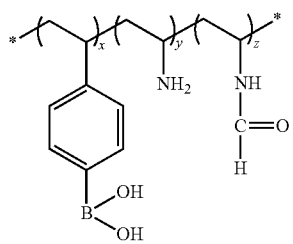

Within the above formula, the ratio of x/(x+y) or x/(x+z) or x/(x+y+z) will vary, thus changing the boronic acid content. The above ratio may vary so as to vary the boronic acid content within the range of 0-30%, with the preferred range being 4-28% and the most preferred range being 5-10%. This "most preferred" range has been selected in part on the basis of cost effectiveness. It will be seen that increasing the boronic acid content increases the delamination peel force; however, a commercially optimal range is as described above. A polymer comprising the above monomers may be prepared within a range of about 100 Da to about 10,000,000 Da, and potentially higher. The preferred range is about 10,000 Da to 100,000 Da.

z represents an unreacted amide monomer, which is optionally present in the polymer.

Polymers according to the invention form bonds in an aqueous environment, permitting an enhanced wet web strength, thus potentially increasing the paper machine's speed.

Preparation of BPVAm of Formula 3

Commercial polyvinylamine (PVAm) ZD1989/104 (M=34 kDa), ZD1989/105 (M=150 kDa), and PolyminRPR 8182 (M=1.5 MDa) were obtained from BASF. Since all three PVAm polymers were synthesized from poly(N-vinyl formamide) by hydrolysis, they were further treated using 5% NaOH at 70° C. for six days to remove residual formamide groups. Then, they were dialyzed against water for ten days and freeze-dried. Hydroxypropyl guar (HP-guar) with a degree of substitution of 0.36 was obtained from Rhone-Poulenc. 4-vinylphenylboronic acid, 4-carboxyphenylboronic acid, N-vinylformamide, chitosan (medium molecular weight), N-(3-dimethylaminopropyl)-N'-ethylcarbodiimide hydrochloride (EDC), 2-(N-morpholino)ethanesulfonic acid (MES), and tris(hydroxymethyl)aminomethane (Tris) were purchased from Sigma-Aldrich. Sodium bicarbonate, sodium dodecyl sulphate, and potassium persulfate were purchased from BDH. Cellulose membrane tubes (Spectra/Por, molecular weight cut off 12-14 kDa) were supplied by Spectrum Labs. All experiments were performed with water from a Millipore Milli-Q system fitted with one Super C carbon cartridge, two ion-exchange cartridges, and one Organex Q cartridge.

Phenylboronic acid-containing polyvinylamine (BPVAm) was prepared by two methods. For the first method, designated "grafting method", PVAm and 4-carboxyphenylboronic acid were first dissolved in water and the solution pH was adjusted to 6.1 using 0.1 M MES buffer. Afterwards, EDC was introduced into the PVAm solution and the reaction was carried out at room temperature for two hours. The product was dialyzed against water for 8 days and freeze-dried. Table 1 shows the preparation recipes of five BPVAm polymers using the "grafting method". For the second method, designated "copolymerization method", BPVAm was prepared by copolymerizing p-vinylphenylboronic acid and N-vinylformamide. During the reaction, 0.2 g p-vinylphenylboronic acid, 2.3 g N-vinylformamide, and 0.06 g sodium dodecyl sulphate (SDS) were first dissolved in 47.5 mL water in a reaction vessel. After the solution reached the thermal equilibrium at 70° C., 0.02 g initiator potassium persulfate was introduced to start the polymerization. The polymerization was carried out under nitrogen environment for 24 hours. Afterwards, 5 g sodium hydroxide was added to the reaction vessel and the reaction was further carried out for 72 hours at 70° C. The product was dialyzed against water for 4 days and freeze-dried.

The average molar percentages of monomer units containing boronic acid of BPVAm polymers (boronic acid content) were determined by proton NMR using a Bruker DRX-200 spectrometer at 30° C. 4 g/L BPVAm solution (in $D_2O$) was first loaded into an NMR sample tube, which was then place into the NMR spectrometer. During the recording of each NMR spectrum, a 6.7 μs pulse (90 degree) width was used, and a delay time of 2.5 s was inserted between successive acquisitions. 100 scans were carried out for each spectrum. Table 1 shows the boronic acid contents of the 6 BPVAm polymers.

Figure 10:
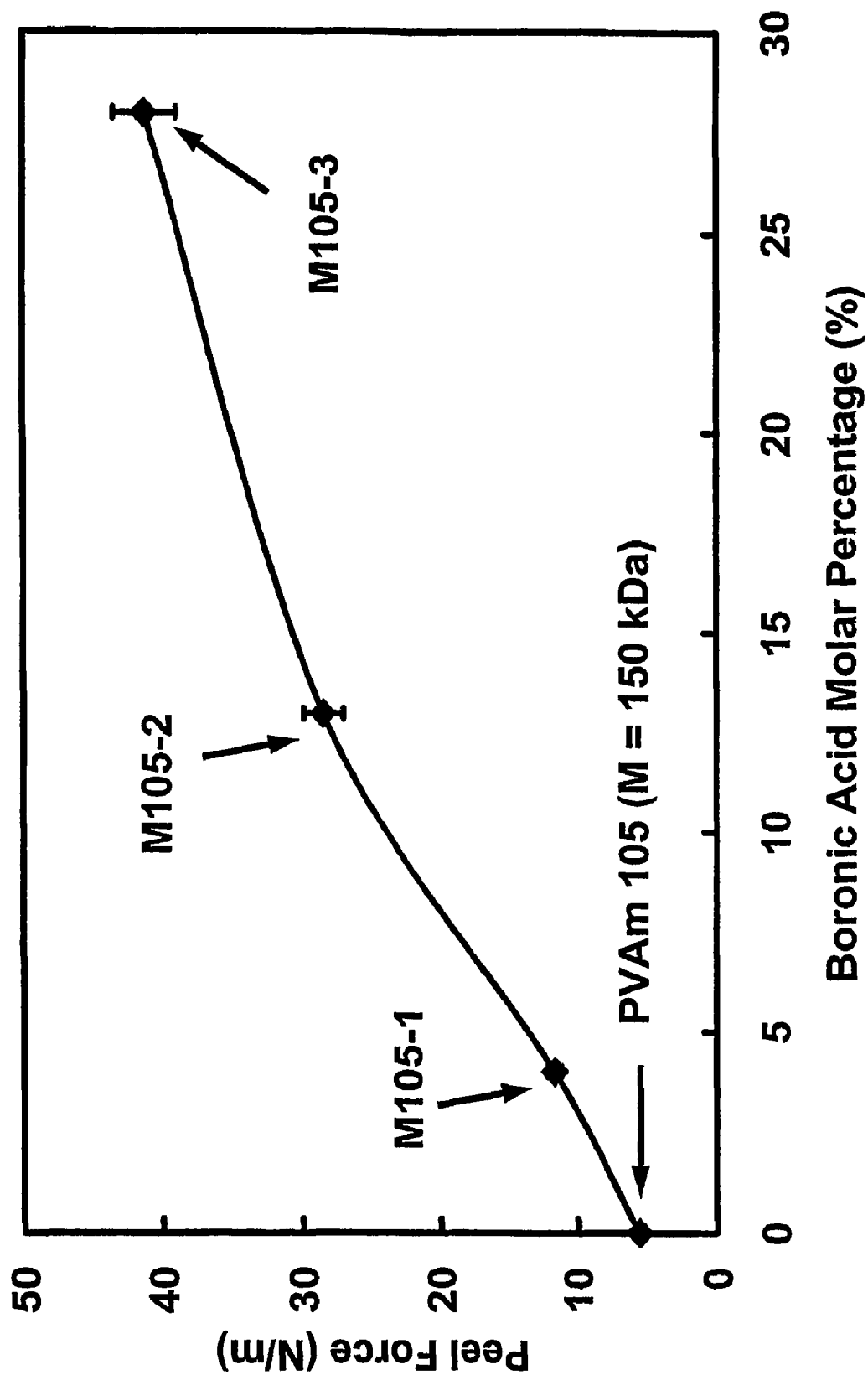
FIG. 10 illustrates the effect of boronic acid content on the ability of BPVAm polymers to increase the adhesion between cellulose films. The error bars are the standard deviations of the mean based on four measurements. 0.015 M MES buffer was used to adjust solution pH to 7.3. All the BPVAm polymers were prepared by grafting 4-carboxyphenylboronic acid to polyvinylamine 105 (150 kDa). The concentrations of all the BPVAm polymers used were 50 mg/L. The concentration of PVAm 105 was 500 mg/L.

The ratio of x/(x+y) or x/(x+z) in the polymers described herein varies between 0 to 1. The molecular weight of those polymers can be from relatively low to very high, therefore x, y and z can be almost any number. The preferred ranges of molecular weight of polymeric compounds of the invention are described above, as well as the preferred x/(x+y) or x/(x+z) ratios which yield varying molar amounts of boronic acid content. The invention includes polymers with an x/(x+y) or x/(x+z) ratio which yields a molar fraction of the boronic acid groups between from 0 to 28%. The effect on wet web strength within this range is shown in FIG. 10.

Preparation of BPVAM-HP-guar Complexes

The complex solutions of BPVAm and HP-guar complex were prepared by adding HP-guar to BPVAm solutions under stirring. Specifically, BPVAm was first dissolved in a pH buffer solution and HP-guar was first dissolved in water. Then, a small amount of the concentrated HP-guar solution was added to the BPVAm solution slowly in the presence of stirring to avoid aggregation.

The interaction between BPVAm and HP-guar was characterized by light scattering using a Lexel laser (wavelength 514 nm) equipped with a BI-9000 AT digital correlator (Brookhaven). The incident laser light power was 100 mw and the pinhole size of the photo multiplier was 200 μm in diameter. Both light scattering intensity and light scattering correlation were recorded at 90 degree angle. The hydrodynamic diameters of BPAm, HP-guar, and their complex were calculated from their light scattering correlations by the exponential method using software BI9000AT version 6.1.

Use of BPVAm in Cellulose Films

Laminates made from regenerated cellulose films were used to as a model for fiber-fiber bonds in paper. Spectra/Por cellulose tubes were first cut into strips of width 2 cm and length 6 cm and then stored in water. Three variations of delamination procedures were conducted to test the influence of BPVAm addition on the adhesion forces between two cellulose films.

The first procedure, designated "soaking", was used to simulate paper wet web strength testing. During the test, the cellulose films were first soaked in BPVAm or BPVAm and HP-guar complex solutions in buffer for 10 minutes. Next, the cellulose films were rinsed using the same pH buffer solution to remove un-adsorbed polymers. Two pre-treated films were laminated by presses between blotting paper at $1.73 \times 10^6$ Pa for three minutes. After pressing, the peel force to separate the two films was measured immediately using an Instron 4411 Universal Tester with a load cell of 50 N. A nominal peeling geometry of 90 degrees was obtained by peeling from a homemade aluminum free-rotating wheel (38 mm wide, 140 mm in diameter with a SKF-6,8-2RS1 radial bearing). The peel speed was set at 20 mm/min.

The second procedure, designated "coating", was also used to simulate paper wet web strength testing. The difference between "soaking" method and "coating" method was the way that BPVAm was applied onto the surfaces of cellulose films. For "coating" method, two cellulose films were removed from water and patted dry with Kimwipes tissue paper to remove residual surface liquid. 15 μL BPVAm solution (or BPVAm and HP-guar complex solution) was dropped on the surface of one film. The second film was then placed on the top of the first film. Care was taken to ensure an even distribution of polymer solution between of the two films. Afterwards, the two films were pressed and peeled using the 90 degree peel test. By using "coating" method, a known and controllable amount of polymer solution can be added in between two cellulose films.

The third set of experiments, designated "coating and drying", were to simulate paper wet strength testing. The only difference between this method and "coating" method was that the two films were dried at room temperature for 24 hours after being pressed. Then, the two films were re-soaked in buffer solution for 30 minutes before the 90 degree peel test. The re-soaking buffer solution was the same as the buffer solution used to dissolve BPVAm.

Results

The interaction between BPVAm M8182-1 (see Table 1) and HP-guar at pH=7.3 was characterized using light scattering technique and the results are shown in Table 2. The hydrodynamic diameters of BPVAm and HP-guar were 136 nm and 165 nm respectively. Upon mixing, the two polymers associated to form aqueous complexes with an average hydrodynamic diameter of 237 nm. Light scattering intensities were also recorded to verify the interaction between BPVAm and HP-guar. The light scattering intensity of the complex solution was 109 kcps (kilo-counts per second) which was much greater than the summation, (70 kcps) of the light scattering intensities of the two polymer solutions, confirming the association between BPVAm and HP-guar.

The cellulose films were treated with BPVAm using the "soaking" method in which two films were soaked in BPVAm and HP-guar complex solution and then rinsed with fresh buffer solution yielding, we presume, adsorbed monolayers. Table 3 summarizes the 90 degree delamination peel force results. The no-polymer control had a peel force of 3.3 N/m probably caused by the capillary force between the two films. When treated with the complex solution of M8182-1 (M=1.5 MDa) and HP-guar, the peel force increased to 22.4 N/m. For comparison, the peel tests were also conducted on the films that had been pre-treated with unmodified PVAm 105 (M=150 MDa) and with chitosan (medium molecular weight). Chitosan was reported to be able to increase paper wet web strength at neutral pH conditions. Since chitosan did not dissolve in water at pH=7.3, the films were first treated using a chitosan solution with a pH value of 5 (0.015 M MES). Then, the films were rinsed using a buffer solution of pH=7.3. As shown, PVAm and chitosan only increased the peeling strength slightly to 5.5 N/m and 7.2 N/m respectively.

Table 4 shows that BPVAm polymers could increase the peel force of cellulose film laminates at pH=7.3 even in the absence of HP-guar. The laminates were prepared using the "soaking" method. The two BPVAm polymers used were M105-1 prepared by the "grafting" method and B-PVAm-1 prepared by the "copolymerization" method. Both polymers have a boronic acid content of around 4%. It was clear that both BPVAm polymers increased the peel force significantly from 3.3 N/m to 11.5 N/m.

Figure 9:
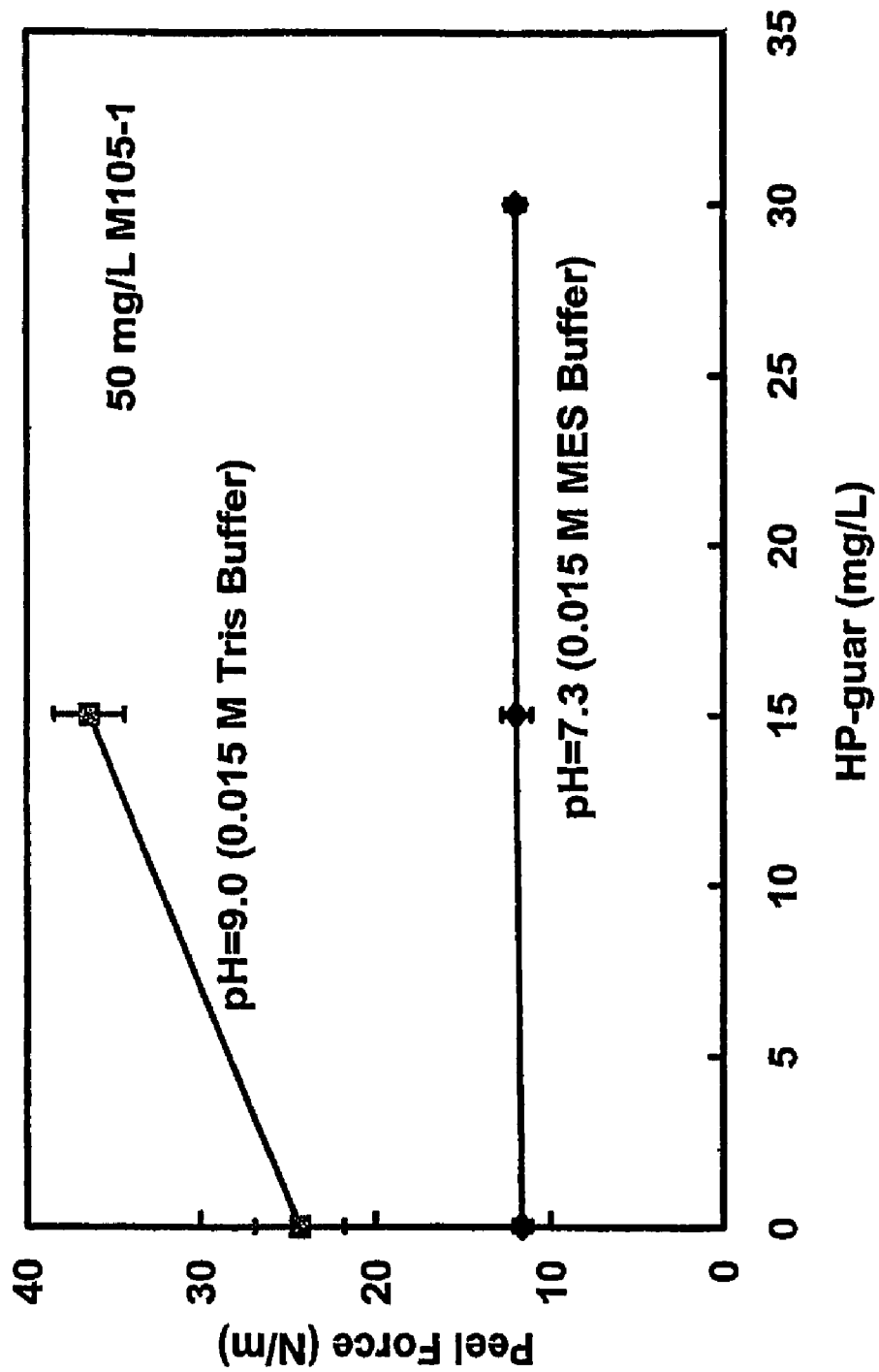
FIG. 9 illustrates the delamination peel force of two cellulose films treated with M105-1 and HP-guar complex solution using the "soaking" method. The error bars are the standard deviations of the mean based on four measurements.

FIG. 9 shows the effect of HP-guar addition on BPVAm M105-1 adhesion for cellulose films using the "soaking" method. Since most modern papermaking processes are carried out at alkaline or neutral conditions, the delamination peel forces were measured at pH=7.3 and pH=9.0. At pH=7.3, increasing HP-guar/M105-1 mass ratio from 0 to 0.6 did not affect the peel force, which remained at around 12 N/m. On the other hand, the peel force increased from 24.3 N/m to 36.4 N/m when HP-guar/M105-1 mass ratio was increased from 0 to 0.3 at pH=9.0.

FIG. 10 shows that the ability of BPVAm polymers to increase cellulose adhesion depended on their boronic acid content. In this experiment, cellulose film laminates were prepared using "soaking" method at pH=7.3. The BPVAm polymers used were synthesized by grafting 4-carboxyphenylboronic acid to polyvinylamine 105 (150 kDa). When the boronic acid content was increased from 4% to 28%, the delamination peel force increased from 11.6 N/m to 41.2 N/m.

Figure 11:
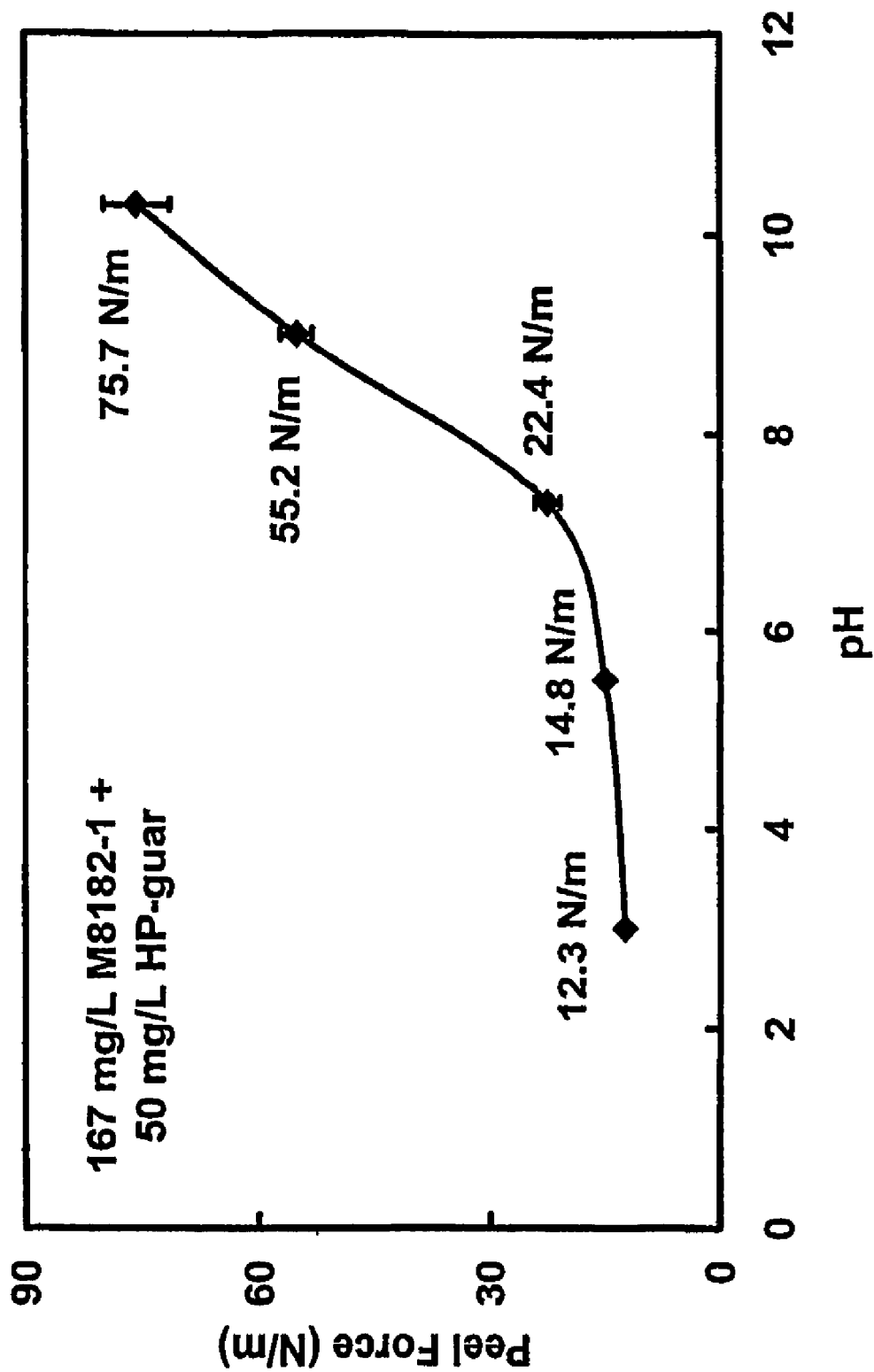
FIG. 11 illustrates the pH effect on the delamination peel force of two cellulose films treated with M8182-1 and HP-guar complex solution using "soaking" method. The error bars are the standard deviations of the mean based on four measurements. 0.015 M Tris buffer was used to adjust solution pH to 10.3 and 9.0, while 0.015 M MES buffer was used to adjust the solution pH to lower values.
Figure 12:
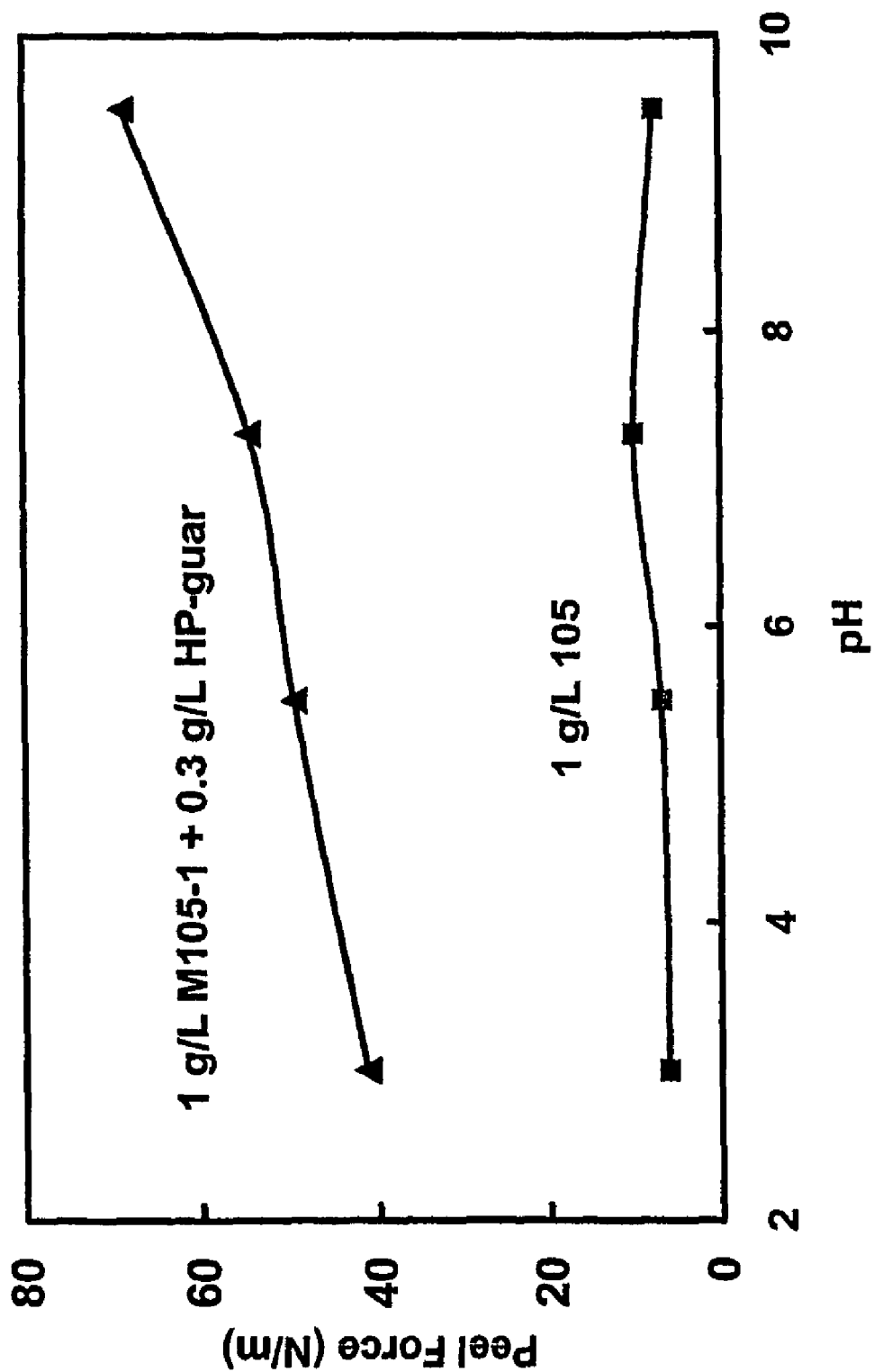
FIG. 12 illustrates the pH effect on the delamination peel force of two cellulose films treated with M105-1 and HP-guar complex solution using the "coating" method. Each point was the average of two measurements. 0.015 M carbonate buffer was used to adjust solution pH to 9.5, while 0.015 M MES buffer was used to adjust solution pH to lower values.

FIGS. 11 and 12 show the effect of pH on BPVAm adhesion for cellulose films. In FIG. 11 cellulose films were treated with M8182-1 and HP-guar complex solution using the "soaking" method. The complexes increased the delamination peel force to 12.3 N/m even at pH=3. When pH was raised above 8, the peeling strength increased dramatically and reached 75.7 N/m at pH=10.3. In FIG. 12, cellulose films were treated with M105-1 and HP-guar complex solution using the "coating" method. The total polymer concentration between two films was calculated to be around 8 mg/m$^2$ cellulose surface, which was much higher than 1 mg/m$^2$, the concentration of adsorbed polymers with one mono-layer. Increasing solution pH from 3.0 to 9.5 increased peel force from around 41.3 N/m to 68.7 N/m. It is worth to note that such peel force increase was rather gradual in comparison with the sharp peel force increase at neutral pH when films were treated using "soaking" method.

Figure 13:
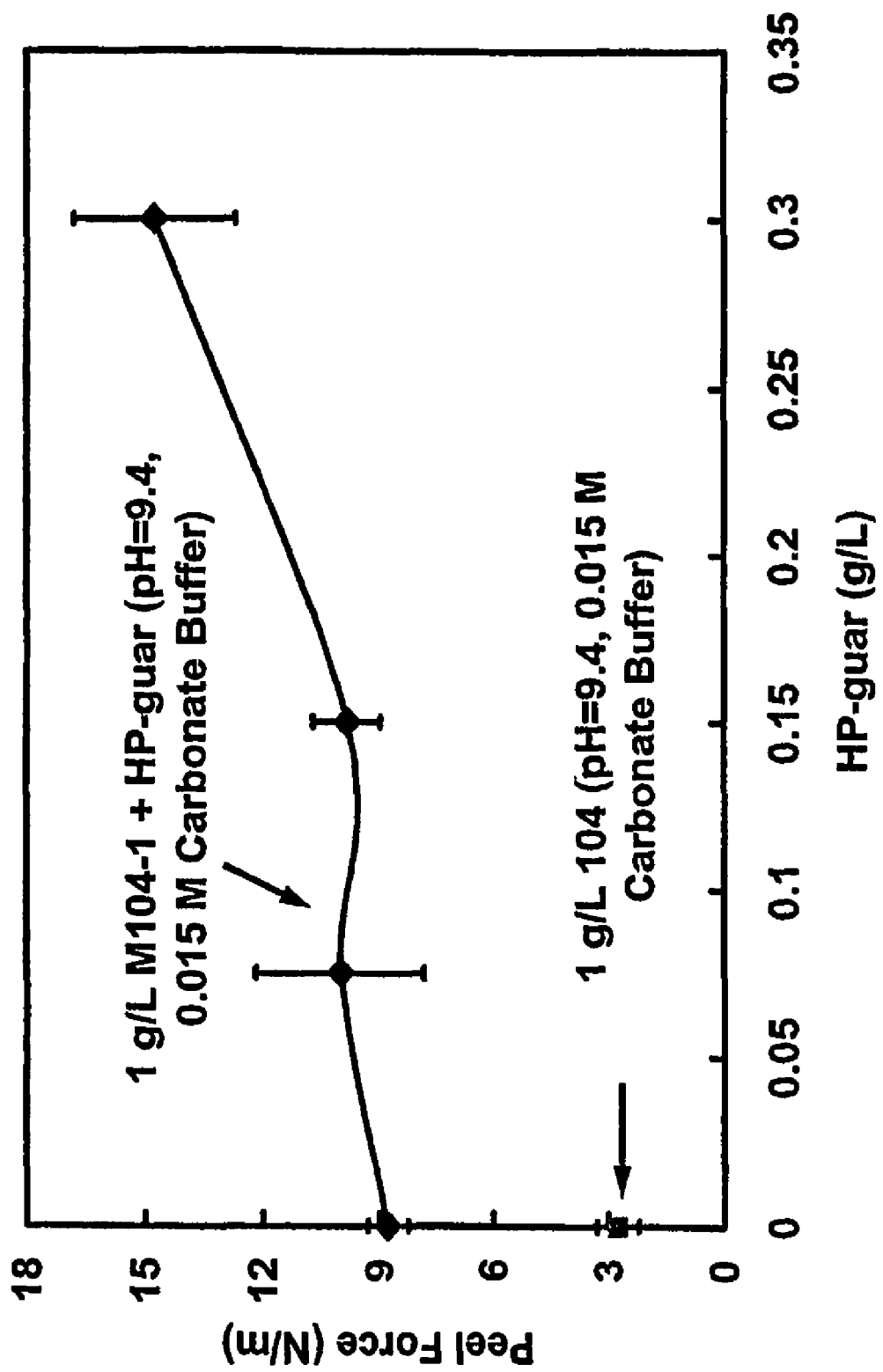
FIG. 13 illustrates the delamination peel force of two cellulose films treated with M104-1 and HP-guar complex solution using the "coating and drying" method. The error bars are the standard deviations of the mean based on four measurements.

FIG. 13 shows the delamination peel forces of cellulose films treated using the "coating and drying" method. In this method, cellulose films were first treated using the "coating" method. After being pressed, they were dried at room temperature for 24 hours and then re-soaked in buffer solution for 30 minute before the 90 degree peel force measurements. The objective was to evaluate the potential of BPVAM and HP-guar complexes to increase paper wet strength. The pH of all the polymer solutions was adjusted to 9.5 using 0.015 M bicarbonate buffer. When 6 mg/m$^2$ polyvinylamine 104 (M=34 kDa) were added in between two films, the delamination peel force was only 2.4 N/m. However, the same amount of BPVAM M104-1 increased the peel force to 8.8 N/m. In addition, introducing 0.3 g/L HP-guar to 1 g/L M014-1 further increased the peel force to 14.7 N/m.

TABLE 1

The recipes for preparing boronic acid - containing polyvinylamine and the percentage of amine groups grafted with phenylboronic acid (grafting percentage). The reactions were conducted in 0.1 M MES buffer (pH = 6.1) at room temperature for two hours. The boronic acid molar content refers to the average molar percentages of monomer units containing boronic acid of BPVAm polymers.

| Sample name | Preparation method | Polyvinylamine | 4-carboxyphenylboronic acid | EDC | Boronic acid molar content |
|---|---|---|---|---|---|
| M104-1 | Grafting | 3.1 g/L 104 (34 kDa) | 1.5 g/L | 38.5 g/L | 5% |
| M105-1 | Grafting | 4.0 g/L 105 (150 kDa) | 2.0 g/L | 50.0 g/L | 4% |
| M105-2 | Grafting | 4.0 g/L 105 (150 kDa) | 4.6 g/L | 75 g/L | 13% |
| M105-3 | Grafting | 2.0 g/L 105 (150 kDa) | 4.0 g/L | 50.0 g/L | 28% |
| M8182-1 | Grafting | 4.0 g/L 8182 (1.5 MDa) | 2.0 g/L | 50.0 g/L | 5% |
| B-PVAm-1 | Copolymerization | | | | 4% |

TABLE 2

Light scattering measurements of HP-guar, M8182-1, and their complexes. All the measurements were conducted in 0.015 M MES buffer (pH = 7.3) at 25° C.. The error limits are the standard deviations of the mean based on five measurements

| Sample | Scattering intensity (kcps) | Hydrodynamic diameter (nm) |
|---|---|---|
| 167 mg/L M8182-1 | 61.7 | 165 ± 6 |
| 50 mg/L HP-guar | 9.0 | 136 ± 9 |
| 167 mg/L M8182-1 + 50 mg/L HP-guar | 109.4 | 237 ± 17 |

TABLE 3

The 90 degree delamination peel force of two cellulose films treated using the "soaking" method. All the polymer solutions contained 0.015 M MES buffer. The pH value of chitosan solution was 5.0 and the pH values of the remaining polymer solutions were 7.3. The cellulose films were rinsed using 0.015 M MES buffer (pH = 7.3) after they soaked in polymer solution.

| Sample | Peel force (N/m) |
|---|---|
| Buffer solution | 3.3 ± 0.2 |
| 500 mg/L polyvinylamine 105 | 5.5 ± 0.4 |
| 250 mg/L chitosan | 7.2 ± 0.3 |
| 500 mg/L M105-1 + 110 mg/L HP-guar | 16.7 ± 2.6 |
| 167 mg/L M8182-1 + 50 mg/L HP-guar | 22.4 ± 1.7 |

TABLE 4

The 90 degree delamination peel force of two cellulose films treated using the "soaking" method. All the polymer solutions contained 0.015 M MES(pH = 7.3).

| Sample | Peel force (N/m) |
|---|---|
| Buffer solution | 3.3 ± 0.2 |
| 50 mg/L M105-1 (4% boronic acid content) (prepared by grafting) | 11.6 ± 0.5 |
| 50 mg/L B-PVAm (4% boronic acid content) (prepared by copolymerization) | 11.4 ± 0.8 |

TABLE 5

The Peeling force results of patially hydrolysed PNVF-boronate using soaking method. The molecular weight of partially hydrolysed PNVF is 150,000. The sample names refer to the degree of hydrolysing, for example B10 has a hydrolysed degree of 10%. The pH value and ionic concentration were adjusted by Tris buffer and NaCl, respectively. The error limits are the standard deviations of the mean based on four measurements.

| Sample name | $NH_2$ content of BPNVF (Molar %) | NHCO content of BPNVF (Molar %) | Boronic acid content of BPNVF (Molar %) | PF(N/m) |
|---|---|---|---|---|
| B10 | 20.9% | 75.7% | 3.4% | 3.33 ± 0.67 |
| B30-1 | 45.95% | 45.1% | 8.95% | 17.15 ± 0.44 |
| B30-2 | 41.98% | 45.1% | 3.98% | 9.24 ± 0.21 |
| B50 | 50.15% | 36.9% | 9.55% | 52.35 ± 1.85 |

REFERENCES

[1] Seth, R. S.; Barbe, M. C.; Williams, J. C. R.; Page, D. H. Tappi Journal 1982, 65, 135.

[2] Lyne, L. M.; Gallay, W. Tappi Journal 1954, 37, 694.

[3] Seth, R. S. Tappi Journal 1995, 78, 99.

[4] Page, D. H. Journal of Pulp and Paper Science 1993, 19, J175.

[5] Laleg, M.; Pikulik, I. I. Nordic Pulp and Paper Research Journal 1991, 3, 99.

[6] Laleg, M.; Pikulik, I. I. Nordic Pulp and Paper Research Journal 1993, 8, 41.

[7] Chen, N.; Hu, S.; Pelton, R. H. Ind. Eng. Chem. Res. 2002, 41, 5366.

[8] Neimo, L. Papermaking Chemistry, Fapet Oy: Helsinki, 1999.

[9] Chan, Lock, Wet-Strength Resins and Their Application, Tappi Press: Atlanta, 1994.

[10] Pelton, R. H.; Hong, J., Tappi 2002, 1, 21.

[11] Gardlund, L.; Wagberg, L.; Gernandt, R., Colloids and Surfaces A 2003, 218, 137.

[12] Bonnet-Gonnet, C.; Castaing, J.; Le Cornec, P., Patent WO 9855694, 1998.

[13] Deutsch, A.; Osoling, S. Journal of the American Chemical Society 1949, 71, 1637.

[14] Niwa, M.; Sawada, T.; Higashi, N. Langmuir 1998, 14, 3916.

[15] Matsumoto, A.; Kurata, T.; Shiino, D.; Kataoka, K. Macromolecules 2004, 37, 1502.

The invention claimed is:

1. A polymeric compound of general formula 1, 1A or 4:

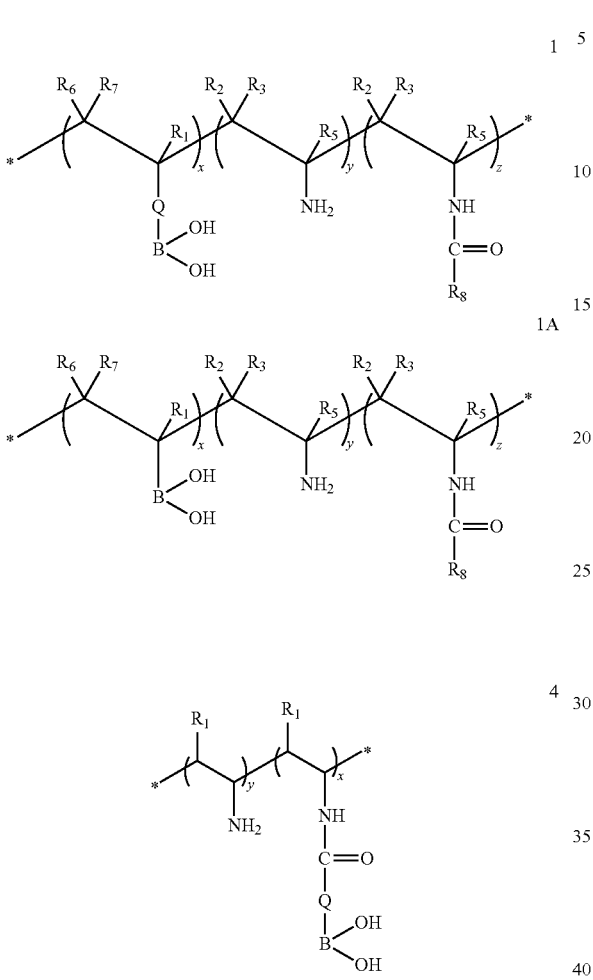

wherein $R_1$ and $R_5$ are each independently selected from H, $C_1$ to $C_6$ branched or non-branched alkyl, substituted or non-substituted cyclic alkyl, substituted or non-substituted aryl, and a ring containing a heteroatom;

$R_2$, $R_3$, $R_6$ and $R_7$ are each independently selected from H, $C_1$ to $C_6$ branched or non-branched alkyl, substituted or non-substituted cyclic alkyl, substituted or non-substituted aryl, and a ring containing a heteroatom or $R_2$ and $R_3$ and/or $R_6$ and $R_7$ are together involved in a ring which is optionally substituted;

$R_8$ is H or a $C_1$ to $C_6$ branched or non-branched alkyl;

Q is selected from $C_1$ to $C_{12}$ branched or non-branched alkyl, substituted or non-substituted cyclic alkyl, substituted or non-substituted phenyl and substituted or non-substituted fused alkyl or phenyl ring, optionally Q bears a cationic group, an anionic group or is a ring including a heteroatom;

x, y and z are the numbers of the repeating monomer units and are each independently selected from 0 and a number $\geq 1$; and wherein at least one of the ratio x/(x+y), x/(x+z) and x/(x+y+z) yields a boronic acid content of between 4 and 28% by molar ratio.

2. A polymeric compound of general formula 2:

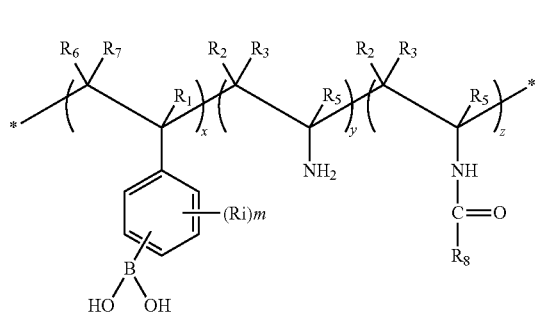

wherein $R_1$ and $R_5$ are each independently selected from H, $C_1$ to $C_6$ branched or non-branched alkyl, substituted or non-substituted cyclic alkyl, substituted or non-substituted aryl, and a ring containing a heteroatom;

$R_2$, $R_3$, $R_6$ and $R_7$ are each independently selected from H, $C_1$ to $C_6$ branched or non-branched alkyl, substituted or non-substituted cyclic alkyl, substituted or non-substituted aryl, and a ring containing a heteroatom or $R_2$ and $R_3$ and/or $R_6$ and $R_7$ are together involved in a ring which is optionally substituted;

$R_8$ is H or a $C_1$ to $C_6$ branched or non-branched alkyl;

m=0, 1, 2, 3 or 4;

Ri are each independently selected from H, $C_1$ to $C_6$ branched or non-branched alkyl, substituted or non-substituted cyclic alkyl, substituted or non-substituted phenyl, cationic group, anionic group, neutral group, and a ring including a heteroatom; and x, y and z are as defined in claim 1.

3. A polymeric compound of general formula 2A:

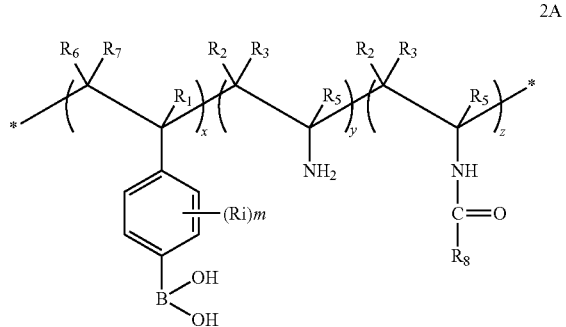

wherein $R_1$ and $R_5$ are each independently selected from H, $C_1$ to $C_6$ branched or non-branched alkyl, substituted or non-substituted cyclic alkyl, substituted or non-substituted aryl, and a ring containing a heteroatom;

$R_2$, $R_3$, $R_6$ and $R_7$ are each independently selected from H, $C_1$ to $C_6$ branched or non-branched alkyl, substituted or non-substituted cyclic alkyl, substituted or non-substituted aryl, and a ring containing a heteroatom or $R_2$ and $R_3$ and/or $R_6$ and $R_7$ are together involved in a ring which is optionally substituted;

$R_8$ is H or a $C_1$ to $C_6$ branched or non-branched alkyl;

m=0, 1, 2, 3 or 4;

Ri are each independently selected from H, $C_1$ to $C_6$ branched or non-branched alkyl, substituted or non-substituted phenyl, cationic group, anionic group, neutral group, and a ring including a heteroatom; and x, y and z are as defined in claim 1.

4. A polymeric compound of formula 3:

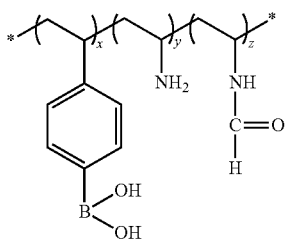

wherein x, y and z are as defined in claim 1.

5. A polymeric compound of Formula 1 or 1A according to claim 1, wherein z=0.

6. A polymeric compound of Formula 1 or 1A according to claim 1, wherein y=0.

7. A polymeric compound of general formula 4:

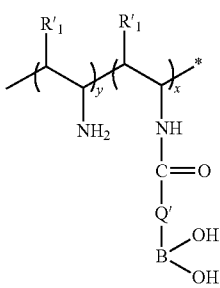

wherein $R_1$, Q, x and y are as defined in claim 1.

8. A polymeric compound of general formula 5:

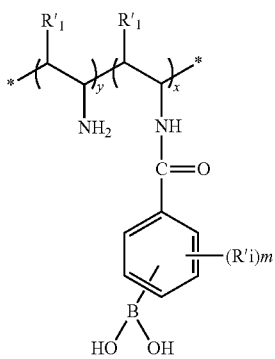

wherein $R_1$, x and y are defined as in claim 1

R'i is independently selected from H, $C_1$ to $C_6$ branched or non-branched alkyl, substituted or non-substituted cyclic alkyl, substituted or non-substituted phenyl, cationic group, anionic group, neutral group, and a ring including a heteroatom;

m=0, 1, 2, 3 or 4.

9. A polymeric compound of general formula 5A:

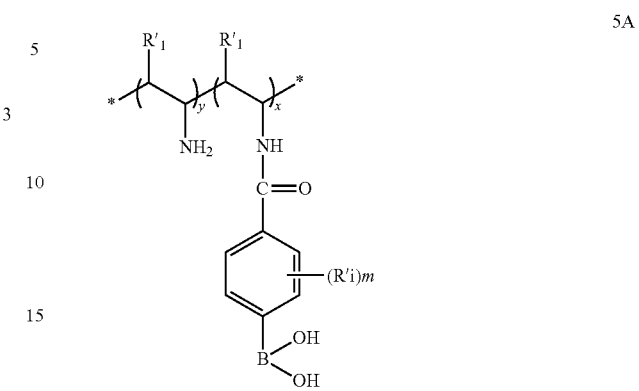

wherein $R_1$, x and y are defined as in claim 1

R'i is independently selected from H, $C_1$ to $C_6$ branched or non-branched alkyl, substituted or non-substituted cyclic alkyl, substituted or non-substituted phenyl, cationic group, anionic group, neutral group, and a ring including a heteroatom;

m=0, 1, 2, 3 or 4.

10. A polymeric compound of general formula 6:

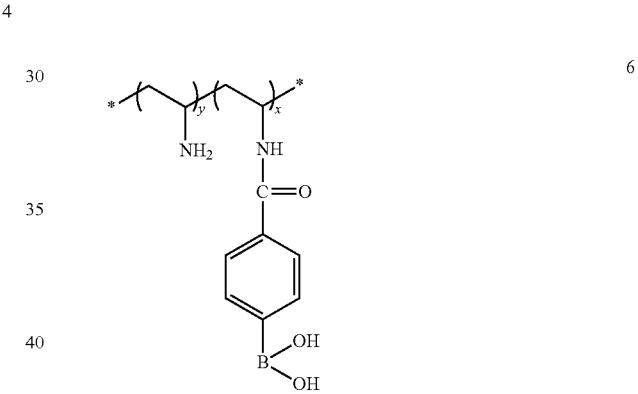

wherein x and y are as defined in claim 1.

11. A polymeric compound as defined in claim 1, wherein said boronic acid content is between 5% and 10%.

12. A polymeric compound as defined in claim 1, wherein the $NH_2$ content is between 10 to 70% molar.

13. A polymeric compound as defined in claim 12, wherein the $NH_2$ content is between 40 to 50% molar.

14. A polymeric compound of Formula 1 or 1A as defined in claim 1, wherein the NHCO content is between 30 to 50% molar.

15. A polymeric compound as defined in claim 14, wherein the NHCO content is between 30 to 50% molar.

16. A process of treating a cellulose film comprising:
 a. providing a solution of a compound according to claim 1 in a pH buffer solution;
 b. soaking the cellulose film in the solution; and
 c. rinsing the cellulose film using the pH buffer solution.

17. A process according to claim 16 further comprising the steps of:
 d. pressing against one another two cellulose films obtained from steps a) through c); and
 e. separating the two films while measuring the peel force.

18. A process according to claim 16, wherein said treatment involves improving characteristics of the film, said characteristics being selected from paper wet web strength, paper wet strength, flocculation, coating formulation, adhesive, and underwater adhesive.

19. The method for increasing the wet web strength of paper by incorporating into the paper-making process a hydroxyl-containing macromolecule and a compound according to claim 1.

20. The method for increasing the wet web strength of paper in a paper-making process by a compound according to claim 1 and a compound selected from the group consisting of cationic water soluble polymers, anionic water soluble polymers, nonionic water soluble polymers, latex particles, microgel particles, water soluble carbohydrates, hydroxypropyl guar, and inorganic particles.

21. The polymeric compound of claim 1, wherein the ratio $x/(x+y)$ yields a boronic acid content of between 4 and 28% by molar ratio.

22. The polymeric compound of claim 1, wherein the ratio $x/(x+z)$ yields a boronic acid content of between 4 and 28% by molar ratio.

23. The polymeric compound of claim 1, wherein the ratio $x/(x+y+z)$ yields a boronic acid content of between 4 and 28% by molar ratio.

* * * * *